(12) United States Patent
Khosravi et al.

(10) Patent No.: US 8,856,534 B2
(45) Date of Patent: Oct. 7, 2014

(54) METHOD AND APPARATUS FOR SECURE SCAN OF DATA STORAGE DEVICE FROM REMOTE SERVER

(75) Inventors: Hormuzd M. Khosravi, Portland, OR (US); David A. Edwards, Granite Bay, CA (US); Venkat R. Gokulrangan, Portland, OR (US); Yasser Rasheed, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 547 days.

(21) Appl. No.: 12/785,146

(22) Filed: May 21, 2010

(65) Prior Publication Data
US 2011/0289306 A1 Nov. 24, 2011

(51) Int. Cl.
*G06F 15/177* (2006.01)
*H04L 9/32* (2006.01)

(52) U.S. Cl.
USPC .......................................... 713/176; 713/164

(58) Field of Classification Search
USPC ................................... 713/164, 176
See application file for complete search history.

(56) References Cited

U.S. PATENT DOCUMENTS

| | | | |
|---|---|---|---|
| 5,623,600 A | 4/1997 | Ji et al. | |
| 5,901,327 A * | 5/1999 | Ofek | 710/5 |
| 5,987,506 A * | 11/1999 | Carter et al. | 709/213 |
| 6,434,681 B1 * | 8/2002 | Armangau | 711/162 |
| 7,386,662 B1 * | 6/2008 | Kekre et al. | 711/113 |
| 7,565,532 B2 * | 7/2009 | Pham et al. | 713/165 |
| 2005/0076228 A1 * | 4/2005 | Davis et al. | 713/188 |
| 2005/0216577 A1 | 9/2005 | Durham et al. | |
| 2006/0005015 A1 * | 1/2006 | Durham et al. | 713/164 |
| 2008/0162809 A1 | 7/2008 | Rothman et al. | |
| 2009/0178033 A1 | 7/2009 | Challener et al. | |
| 2009/0319806 A1 * | 12/2009 | Smith et al. | 713/193 |

(Continued)

FOREIGN PATENT DOCUMENTS

CN 101488092 A 7/2009
EP 1343288 A1 9/2003

(Continued)

OTHER PUBLICATIONS

Arvind Kumar, Purushottam Goel, Ylian Saint Hilaire. "An Introduction to Intel® Active Management Technology (Intel® AMT)" © 2008 Intel Corporation. (12 pages).*

(Continued)

*Primary Examiner* — Darren B Schwartz
*Assistant Examiner* — Thomas Gyorfi
(74) *Attorney, Agent, or Firm* — Barnes & Thornburg, LLP

(57) ABSTRACT

A method and device for providing a secure scan of a data storage device from a remote server are disclosed. In some embodiments, a computing device may include an in-band processor configured to execute an operating system and at least one host driver, communication circuitry configured to communicate with a remote server, and an out-of-band (OOB) processor capable of communicating with the remote server using the communication circuitry irrespective of the state of the operating system. The OOB processor may be configured to receive a block read request from the remote server, instruct the at least one host driver to send a storage command to a data storage device, receive data retrieved from the data storage device and authentication metadata generated by the data storage device, and transmit the data and the authentication metadata to the remote server.

25 Claims, 5 Drawing Sheets

(56) References Cited

U.S. PATENT DOCUMENTS

| | | | |
|---|---|---|---|
| 2010/0083381 A1 | 4/2010 | Khosravi et al. | |
| 2010/0306177 A1 | 12/2010 | Khosravi et al. | |
| 2011/0154023 A1* | 6/2011 | Smith et al. | 713/155 |

FOREIGN PATENT DOCUMENTS

| | | | |
|---|---|---|---|
| JP | 2005-244678 A | 9/2005 | |
| JP | 2007-528083 A | 10/2007 | |
| JP | 2008-102678 A | 5/2008 | |
| JP | 2010-086538 A | 4/2010 | |
| JP | 2011034349 A | 2/2011 | |
| KR | 1020020002953 A | 1/2002 | |

OTHER PUBLICATIONS

Arvind Kumar, Purushottam Goel, Ylian Saint Hilaire. "Solving End User Problems with Intel® Active Management Technology (Intel® AMT)" © 2008 Intel Corporation (14 pages).*

Arvind Kumar, Purushottam Goel, Ylian Saint Hilaire. "Using Intel® Active Management Technology (Intel® AMT) in Small to Medium Business" © 2008 Intel Corporation (18 pages).*

"Architecture Guide: Intel® Active Management Technology" Article published May 31, 2009 (9 pages + cover) http://software.intel.com/en-us/articles/architecture-guide-intel-active-management-technology/.*

"Intel Active Management Technology System Defense and Agent Presence Overview" Version 3.0.4, Feb. 2007 (26 pages).*

"Intel Virtualization Technology for Directed I/O" vol. 10, Issue 03, ISSN 1535-864X Published Aug. 10, 2006 (pp. 179-192).*

"Out-of-Band", Wikipedia, The Free Encyclopedia, retreived on Apr. 2, 2011, Webpage available at: <http://en.wikipedia.org/wiki/Out-of-band>.

International Search Report and Written Opinion received for PCT/US11/037374, mailed Feb. 9, 2012, 9 pages.

International Preliminary Report on Patentability received for PCT Application No. PCT/US2011/037374, mailed on Dec. 6, 2012, 6 pages.

European Search Report received for European Patent Application No. 11250519.3, mailed Nov. 7, 2012, 3 pages.

Office Action received for Korean Patent Application No. 10-2011-0047796, mailed Oct. 11, 2012, 4 pages of Korean Office Action and 3 pages of unofficial English translation.

Miller et al., "Strong Security for Network-Attached Storage," Proceedings of the FAST 2002 Conference on File and Storage Technologies, Jan. 30, 2002, 14 pages, retrieved from http://static.usenix.org/events/fast02/full_papers/miller/miller.pdf.

Official Communication received for European Patent Application No. 11250519.3, mailed Jan. 10, 2013, 8 pages.

Office Action received for Chinese Patent Application No. 201110131539.7, mailed on Jun. 5, 2013, 6 pages of Chinese Office Action and 9 pages of unofficial English translation.

Decision for Grant received in Japanese Patent Application No. 2011-103280, mailed Aug. 6, 2013, 2 pages of Decision to Grant including 1 page of partial, unofficial English translation.

Office Action received for Chinese Patent Application No. 201110131539.7, mailed on Jan. 20, 2014, 5 pages of Chinese Office Action and 7 pages of unofficial English translation.

Office Action received in Japanese Application No. 2011-103280, mailed Apr. 23, 2013, 3 pages of Japanese Office Action and 2 pages of unofficial English translation.

Office Action received for Chinese Patent Application No. 201110131539.7, mailed on May 6, 2014, 5 pages of Chinese Office Action and 8 pages of unofficial English translation.

* cited by examiner

METHOD AND APPARATUS FOR SECURE SCAN OF DATA STORAGE DEVICE FROM REMOTE SERVER

BACKGROUND

The data residing on data storage devices, such as hard disk drives and solid state drives, by way of example, is subject to corruption and attack by malicious software (malware). Anti-virus and manageability software packages have been developed by independent software vendors (ISVs) to scan data storage devices to detect corrupted data or malware and/or to provide back-up copies of data. Some storage, security, and manageability ISVs implement services, such as anti-virus scans, removal of malware, system repair, and system reimaging, for example, over the Internet. These Internet-based services still typically rely on local software agents running on the local computing device.

These software solutions, however, are themselves subject to attack by rootkits, spyware, and other types of malware that operate on the premise of hiding themselves from detection. For instance, malware that has disguised itself in the storage stack as a filter driver may be able to provide non-authentic data to the anti-virus or manageability software when a scan of the data storage device is requested (thereby hiding the actual, corrupted data from the software). In other words, the data that is scanned by the anti-virus or manageability software may not be the data that actually resides on the data storage device. Furthermore, once a rootkit is able to hide itself on the platform (e.g., in the master boot record), the rootkit can then observe all user activity, capture user data, perform circumvention of user actions, and other malicious activities. An increasing number of incidents of rootkits, spyware, and other malware have been discovered hiding themselves from users and executing in the background of computing systems, collecting sensitive information and slowing down the systems considerably.

BRIEF DESCRIPTION OF THE DRAWINGS

The systems, devices, and methods described herein are illustrated by way of example, and not by way of limitation, in the accompanying figures. For simplicity and clarity of illustration, elements illustrated in the figures are not necessarily drawn to scale. For example, the dimensions of some elements may be exaggerated relative to other elements for clarity. In the following figures.

DETAILED DESCRIPTION OF THE DRAWINGS

Figure 1:
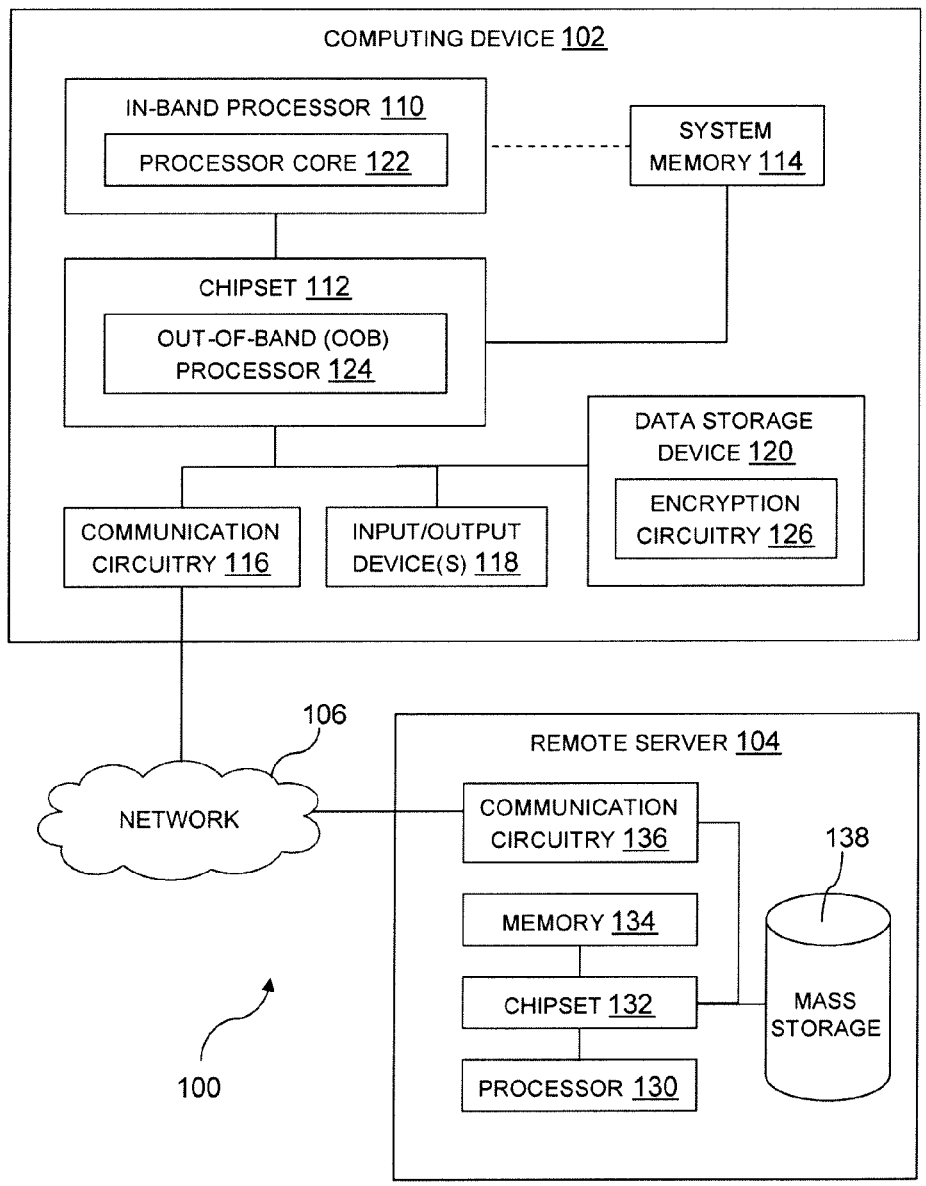
FIG. 1 is a simplified block diagram of one embodiment of a system configured to provide a secure scan of a data storage device of a computing device from a remote server.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention as defined by the appended claims.

In the following description, numerous specific details such as logic implementations, opcodes, means to specify operands, resource partitioning/sharing/duplication implementations, types and interrelationships of system components, and logic partitioning/integration choices may be set forth in order to provide a more thorough understanding of the present disclosure. It will be appreciated, however, by one skilled in the art that embodiments of the disclosure may be practiced without such specific details. In other instances, control structures, gate level circuits, and full software instruction sequences may have not been shown in detail in order not to obscure the disclosure. Those of ordinary skill in the art, with the included descriptions, will be able to implement appropriate functionality without undue experimentation.

References in the specification to "one embodiment", "an embodiment", "an illustrative embodiment", etcetera, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Some embodiments of the disclosure may be implemented in hardware, firmware, software, or any combination thereof. Embodiments of the disclosure implemented in a computing device may include one or more bus-based interconnects between components and/or one or more point-to-point interconnects between components. Embodiments of the invention may also be implemented as instructions stored one or more tangible, machine-readable media, which may be read and executed by one or more processors. A tangible, machine-readable medium may include any tangible mechanism for storing or transmitting information in a form readable by a machine (e.g., a computing device). For example, a tangible, machine-readable medium may include read only memory (ROM), random access memory (RAM), magnetic disk storage media, optical storage media, flash memory devices, and other tangible media.

The present disclosure generally relates to methods and apparatus that provide a secure scan of a data storage device from a remote server. These methods and apparatus ensure that the scanned data is actually retrieved from the data storage device and not falsely provided by some piece of malware (e.g., a rootkit hiding on the computing device). According to the present disclosure, an out-of-band (OOB) agent is used to implement a block read/write interface between the remote server and the data storage device. The OOB agent, in conjunction with a host driver of the computing system, retrieves data from the data storage device in a trusted fashion and provides this data to the remote server. As the OOB agent is tamper resistant, the remote server may be assured that the data is not being forged by some piece of malware. In some embodiments, the OOB agent may also retrieve authentication metadata generated by an encryption engine of the data storage device. This authentication metadata may be used, by either the OOB agent or the remote server, to verify that the data was actually retrieved from the data storage device. Initially, various hardware components of a system 100 are described below with reference to FIG. 1. Next, one embodiment of possible software/firmware environments of the system 100 and an associated method 300 for providing the secure scan are described below with reference to FIGS. 2 and 3. Finally, another embodiment of possible software/firmware environments of the system 100 and an associated method 500 for providing the secure scan are described below with reference to FIGS. 4 and 5.

Referring now to FIG. 1, the illustrative system 100 configured to provide a secure scan of a data storage device 120 from a remote server 104 includes a computing device 102, the remote server 104, and a network 106 that communicatively couples the computing device 102 to the remote server 104. Although only one computing device 102, one remote server 104, and one network 106 are illustratively shown in FIG. 1, the system 100 may include any number of computing devices 102, remote servers 104, and networks 106 of similar or dissimilar architecture. For instance, the computing device 102 may communicate over one or more networks 106 with multiple remote servers 104, and each remote server 104 may communicate over one or more networks 106 with multiple computing devices 102.

The computing device 102 may be embodied as any type of electronic device capable of performing the functions described herein. By way of example, the computing device 102 may be embodied as a personal computer, a workstation, a laptop computer, a handheld computer, a mobile internet device, a cellular phone, a personal data assistant, a telephony device, a network appliance, a virtualization device, a storage controller, or other computer-based device. In the illustrative embodiment shown in FIG. 1, the computing device 102 includes an in-band processor 110, a chipset 112, a system memory 114, communication circuitry 116, one or more input/output devices 118, and a data storage device 120. In some embodiments, several of the foregoing components may be incorporated on a motherboard of the computing device 102, while other components may be communicatively coupled to the motherboard via, for example, a peripheral port. Furthermore, it should be appreciated that the computing device 102 may include other components, sub-components, and devices commonly found in a computer and/or computing device, which are not illustrated in FIG. 1 for clarity of the description.

Figure 2:
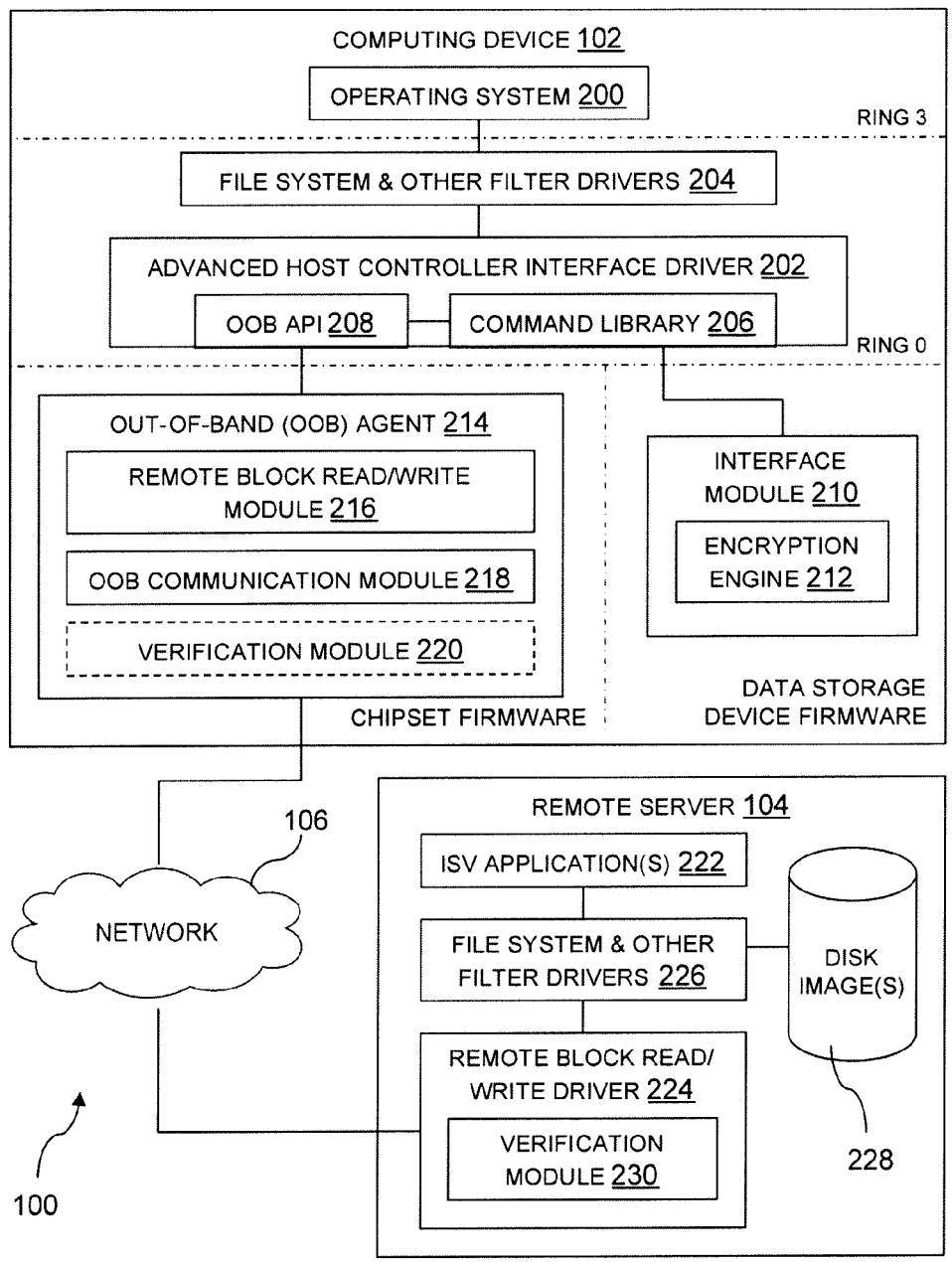
FIG. 2 is a simplified block diagram of one embodiment of the software/firmware environments of the computing device and the remote server of FIG. 1.
Figure 4:
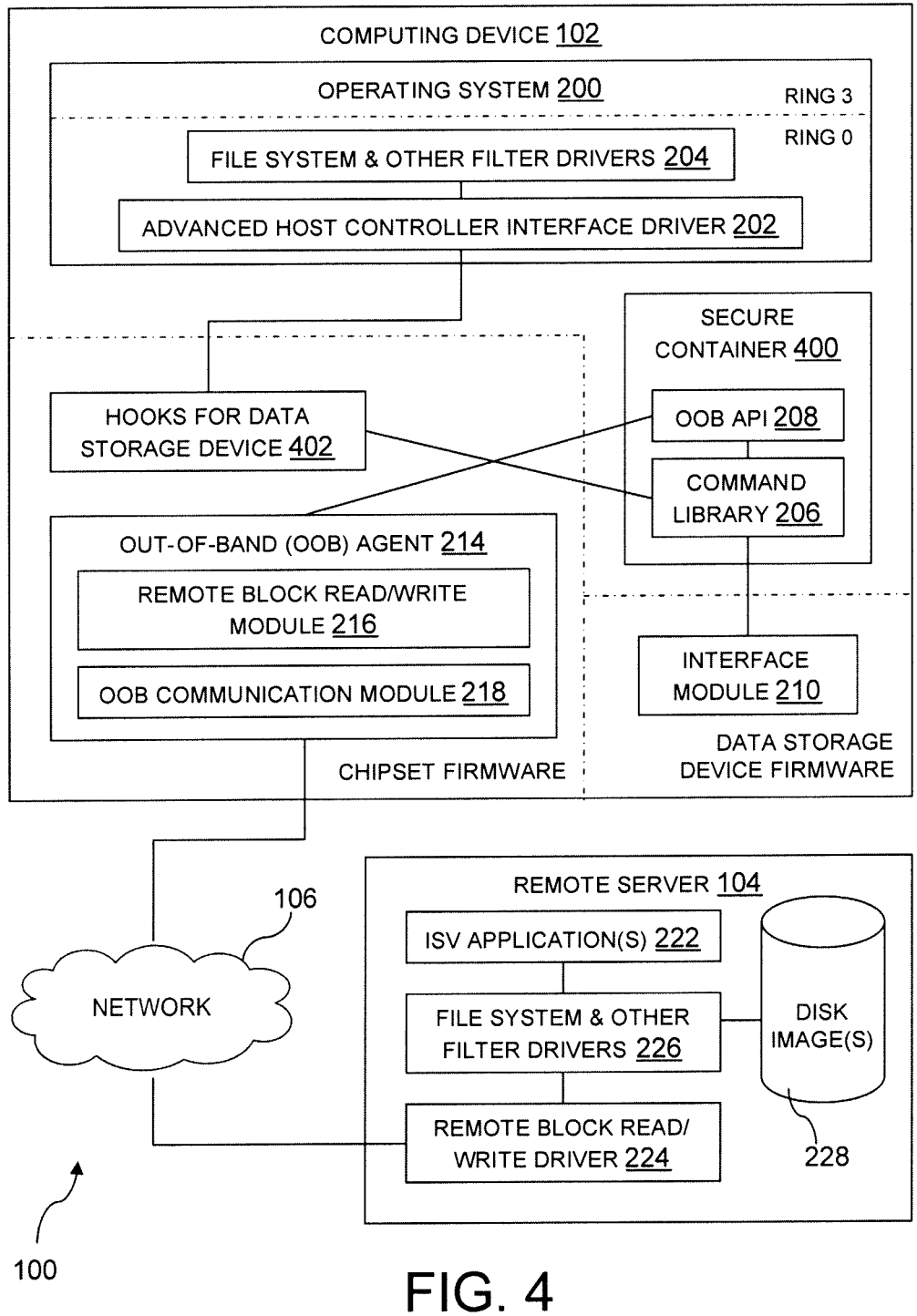
FIG. 4 is a simplified block diagram of another embodiment of the software/firmware environments of the computing device and the remote server of FIG. 1.

The in-band processor 110 of the computing device 102 may be any type of processor capable of executing software/firmware, such as a microprocessor, digital signal processor, microcontroller, or the like. The in-band processor 110 is illustratively embodied as a single core processor having a processor core 122. However, in other embodiments, the in-band processor 110 may be embodied as a multi-core processor having multiple processor cores 122. Additionally, the computing device 102 may include additional in-band processors 110 having one or more processor cores 122. The in-band processor 110 is generally responsible for executing a software stack, which may include an operating system 200 and various applications, programs, libraries, and drivers 202, 204 resident on the computing device 102 (as shown in FIGS. 2 and 4 and described below).

The chipset 112 of the computing device 102 may include a memory controller hub (MCH or "northbridge"), an input/output controller hub (ICH or "southbridge"), and a firmware device. The firmware device of the chipset 112 may be embodied as a memory device for storing Basic Input/Output System (BIOS) data and/or instructions and/or other information (e.g., a BIOS driver used during booting of the computing device 102). In other embodiments, chipsets having other configurations may be used. For example, in some embodiments, the chipset 112 may be embodied as a platform controller hub (PCH). In such embodiments, the memory controller hub (MCH) may be incorporated in or otherwise associated with the in-band processor 110, and the in-band processor 110 may communicate directly with the system memory 114 (as shown by the hashed line in FIG. 1). In any of these configurations, the chipset 112 also includes an out-of-band (OOB) processor 124, which will be described in more detail below.

The in-band processor 110 is communicatively coupled to the chipset 112 via a number of signal paths. These signal paths (and other signal paths illustrated in FIG. 1) may be embodied as any type of signal paths capable of facilitating communication between the components of the computing device 102. For example, the signal paths may be embodied as any number of wires, cables, light guides, printed circuit board traces, via, bus, intervening devices, and/or the like.

The system memory 114 of the computing device 102 is also communicatively coupled to the chipset 112 via a number of signal paths. The system memory 114 may be embodied as one or more memory devices or data storage locations including, for example, dynamic random access memory devices (DRAM), synchronous dynamic random access memory devices (SDRAM), double-data rate synchronous dynamic random access memory device (DDR SDRAM), flash memory devices, and/or other volatile memory devices. Additionally, although only a single system memory device 114 is illustrated in FIG. 1, in other embodiments, the computing device 102 may include additional system memory devices. The operating system 200, applications, programs, libraries, and drivers 202, 204 that make up the software stack executed by the in-band processor 110 may reside in system memory 114 during execution. Furthermore, software and data stored in system memory 114 may be swapped between system memory 114 and the data storage device 120 as part of memory management operations.

The communication circuitry 116 of the computing device 102 may be embodied as any number of devices and circuitry for enabling communications between the computing device 102 and the remote server 104 over the network 106. The network 106 may be embodied as any type of wired and/or wireless network, such as a local area network, a wide area network, a publicly available global network (e.g., the Internet), or any combination thereof. Furthermore, the network 106 may include any number of additional devices to facilitate communication between the computing device 102 and the remote server 104, such as routers, switches, intervening computers, and/or the like. The communication circuitry 116 may include one or more wired and/or wireless network interfaces to facilitate communications over the wired and/or wireless portions of the network 106. Communication circuitry 116 is also communicatively coupled to the chipset 112 via a number of signal paths, allowing both the in-band processor 110 and the OOB processor 124 to independently access the network 106.

The input/output device(s) 118 of computing device 102 may include any number of peripheral or interface devices. By way of illustrative example, the input/output device(s) 118 may include a display, a mouse, a keyboard, and/or one or more external speakers of the computing device 102. The particular devices included in the input/output device(s) 118 may depend upon, for example, the intended use of the computing device 102. The input/output device(s) 118 are communicatively coupled to the chipset 112 via a number of signal paths, allowing the chipset 112 and/or in-band processor 110 to receive inputs from and send outputs to the input/output device(s) 118, in some embodiments.

The computing device 102 also includes a data storage device (DSD) 120, which may be illustratively embodied as any type of device configured for the short-term or long-term storage of data such as, for example, memory devices and circuits, memory cards, hard disk drives, solid-state drives, or other data storage devices. In some embodiments, the DSD 120 may include non-volatile memory capable of retaining stored data even when the DSD 120 is not powered. Additionally, although only a single DSD 120 is illustrated in FIG. 1, in other embodiments, the computing device 102 may include additional data storage devices. The DSD 120 is also communicatively coupled the chipset 112 via a number of signal paths. In some embodiments, the DSD 120 may be coupled to the chipset 112 via a high-speed serial link, such as a Peripheral Component Interconnect Express (PCIe) interface or a Serial AT Attachment (SATA) interface. It will be appreciated that other types of interfaces between the DSD 120 and the chipset 112 (e.g., parallel signal paths) are contemplated. In the illustrative embodiment of FIG. 1, the DSD 120 includes encryption circuitry 126, providing the DSD 120 with a hardware-based encryption engine 212 (as shown in FIG. 2). As further described below, the encryption circuitry 126 (and encryption engine 212 implemented therewith) allows the DSD 120 to locally generate authentication metadata for data retrieved from the DSD 120.

The chipset 112 includes an out-of-band (OOB) processor 124, which is distinct from and generally operates independently of the in-band processor 110. The OOB processor 124 may be embodied as any type of processor capable of executing software/firmware, such as a microprocessor, digital signal processor, microcontroller, or the like, including one or more processors having one or more processor cores (not shown). Although the OOB processor 124 is illustrated in FIG. 1 as being integrated into the chipset 112, in other embodiments, the OOB processor 124 may be embodied as one or more separate integrated circuits disposed on an expansion board that is communicatively coupled to the chipset 112 via a number of signal paths. In some embodiments, the OOB processor 124 may be independently communicatively coupled to various components of the computing device 102 (e.g., the system memory 114 and the communication circuitry 116) via a number of signal paths. Alternatively or additionally, the OOB processor 124 may include built-in components with similar functionality, such as a dedicated memory and/or dedicated communication circuitry (not shown).

The OOB processor 124 is configured for managing particular functions of the computing device 102 irrespective of the operational state of the in-band processor 110 or of the operating system 200 of the computing device 102. To facilitate such independent operation, the OOB processor 124 may be provided with an independent connection to the power circuitry (not shown) of the computing device 102, allowing the OOB processor 124 to retain power even when other components of the computing device 102 are powered down or turned off. Furthermore, the OOB processor 124 may be provided with one or more independent network interfaces via communication circuitry 116, which is also provided with an independent connection to the power circuitry (not shown), allowing out-of-band communications over the network 106. In other words, the OOB processor 124 is able to communicate directly with devices on the network 106 (e.g., remote server 104), outside of the operating system 200 executing on in-band processor 110. In fact, this communication may take place without a user's knowledge. The OOB processor 124 is also capable of causing the computing device 102 to return to a full-power operational state, including booting the operating system 200. In summary, the OOB processor 124 may operate intelligently based on incoming requests/commands and communicate across the network 106 whether the in-band processor 110 is turned off, running on standby, being initialized, or in regular operation and whether the operating system 200 is booting, running, crashed, or otherwise.

In some illustrative embodiments, the OOB processor 124 may be implemented using Intel® Active Management Technology (Intel® AMT), using a portion of Intel® AMT, or using an Intel® Management Engine (Intel® ME), all available from Intel Corporation of Santa Clara, Calif., and/or within chipsets sold by Intel Corporation. Intel AMT® embedded platform technology enables out-of-band access to hardware and software information stored in non-volatile memory on each endpoint device, eliminating the need for a functioning operating system and many of the software agents found in other management tools.

The remote server 104 may be embodied as any type of computing device separate from the computing device 102. By way of example, the remote server 104 may be embodied as a personal computer, a workstation, a laptop computer, a handheld computer, a mobile internet device, a cellular phone, a personal data assistant, a telephony device, a network appliance, a virtualization device, a storage controller, or other computer-based devices configured to communicate with the computing device 102 over the network 106. In the illustrative embodiment shown in FIG. 1, the remote server 104 includes a processor 130, a chipset 132, a system memory 134, communication circuitry 136, and one or more mass storage devices 138 (which may each be similar in configuration and operation to the in-band processor 110, the chipset 112, the system memory 114, the communication circuitry 116, and the data storage device 120, respectively, of computing device 102). It is contemplated that the remote server 104 may have other configurations and/or include other components not shown in FIG. 1 (e.g., one or more input/output devices).

Referring now to FIG. 2, one illustrative embodiment of the software/firmware environments running on the computing device 102 and the remote server 104 of the system 100 is shown as a simplified block diagram. The software stack of the computing device 102 includes an operating system (OS) 200, an advanced host controller interface (AHCI) driver 202, and a file system and other filter drivers 204 (each of which may be executed by the in-band processor 110 and/or stored in the system memory 114 or on the DSD 120). The OS 200 resides in the userspace (Ring 3) and hosts the higher-level applications with which a user of the computing device 102 typically interacts. The OS 200 calls on the file system and filter drivers 204, including the AHCI driver 202, which reside in the kernel (Ring 0), to access the hardware components of the computing device 102 (e.g., DSD 120). It will be appreciated that any of these software modules, including the OS 200 and/or drivers 202, 204, may also be implemented partially or fully in firmware or hardware, in some embodiments.

The AHCI driver 202 is shown separately from the file system and other filter drivers 204 in FIG. 2, as the AHCI driver 202 is configured to interact with an interface module 210 of the DSD 120 to perform various read/write operations. Specifically, the AHCI driver 202 includes a library 206 of storage commands that may be sent by the AHCI driver 202 to the DSD interface module 210. These storage commands in library 206 are requests and/or instructions to the DSD 120 to perform some action(s). For instance, where the DSD 120 is a NAND flash memory device connected via a PCIe interface, the AHCI driver 202 may contain a NAND command library 206 of storage commands that cause the DSD 120 to perform various read/write operations. As another example, where the DSD 120 is a solid-state drive connected via a SATA interface, the AHCI driver 202 may contain an ATA command library 206 of storage commands that cause the DSD 120 to perform various read/write operations. Thus, when the AHCI driver 202 is requested (e.g., by the OS 200) to retrieve the data at a certain logical block address (LBA) in the DSD 120, the AHCI driver 202 selects the appropriate storage command from the library 206 and sends this storage command to the DSD 120. Although the illustrative embodiment shown in FIG. 2 uses the AHCI driver 202 to implement an interface to the DSD interface module 210, it is contemplated that any host driver(s) of the computing device 102 having access to the DSD 120 (i.e., having the appropriate storage command library 206) may be used, additionally or alternatively to the AHCI driver 202. In some embodiments, an Intel® Rapid Storage Technology (Intel® RST) driver, available from Intel Corporation of Santa Clara, Calif., may be used, for example.

The computing device 102 of FIG. 2 also includes several firmware modules, such as the DSD interface module 210, which may be executed on the DSD 120, and the OOB agent 214, which may be executed on the OOB processor 124. Although shown as residing in the DSD 120 firmware and the chipset 112 firmware, respectively, it will be appreciated that the DSD interface module 210 and the OOB agent 214 may each, additionally or alternatively, be embodied as one or more hardware and/or software modules. The DSD interface module 210 is generally configured to receive storage commands from the AHCI driver 202 (or other host driver), as described above, and to control the DSD 120 to perform various actions (e.g., read/write operations).

The DSD interface module 210 includes a hardware-based encryption engine 212, which may include firmware or software that is executed by the encryption circuitry 126 of the DSD 120. In some embodiments, the DSD interface module 210 may be configured to employ the encryption engine 212 to generate authentication metadata for data retrieved from the DSD 120 in response to a particular storage command from the AHCI driver 202 (or a particular class or category of storage commands). In other embodiments, the encryption engine 212 may generate authentication metadata for data retrieved from the DSD 120 in response to any storage command received by the DSD interface module 210. By way of illustrative example, the encryption engine 212 may be embodied in firmware which conforms to the Opal Security Subsystem Class standard (promulgated by the Trusted Computing Group).

The authentication metadata generated by the encryption engine 212 of the DSD 120 may take any form that may be used to verify the authenticity of the associated data. In some embodiments, the encryption engine 212 may generate a message authentication code (MAC) to be included in the authentication metadata by applying a keyed hash function that uses a shared secret key to the data retrieved from the DSD 120. Any other component, device, or user also possessing the shared secret key may then reapply the keyed hash function to the data and compare the output to the MAC included in the authentication metadata. Additionally or alternatively, the encryption engine 212 may generate a counter value (such as a time-stamp or other token indicating the time that the data was retrieved from the DSD 120) to be included in the authentication metadata. Any other component, device, or user may then compare the time the data was expected to be retrieved from the DSD 120 to protect against replay attacks (involving stale data). In other embodiments, the encryption engine 212 may generate a digital signature to be included in the authentication metadata by applying a signing algorithm that uses a private key to the data retrieved from the DSD 120. Any other component, device, or user possessing the public key corresponding to the private key may then apply a signature-verifying algorithm using the authentication metadata. In still other embodiments, the encryption engine 212 may employ any number of cryptographic hash functions to generate authentication metadata.

The OOB agent 214, which provides the remote server 104 with access to the DSD 120, via a host driver, is illustrated as a firmware module that is executed on the OOB processor 124 in the embodiment of FIG. 2 (though the OOB agent 214 may be embodied in hardware, firmware, software, or any combination thereof, in other embodiments). The OOB agent 214 is generally always available to the remote server 104 and tamper resistant to malware, due to the properties of the OOB processor 124 described above. The OOB agent 214 includes a remote block read/write module 216, an OOB communication module 218, and (in some embodiments) a verification module 220. The OOB communication module 218 allows the OOB agent 214 to control various portions of the communication circuitry 116 of the computing device 102 to send and receive various network messages to and from the remote server 104 over the network 106. The remote block read/write module 216 provides an interface for the remote server to request the data at a particular LBA on the DSD 120. When a request to read data from the DSD 120 is received via the OOB communication module 218, the remote block read/write module 216 forwards the request to the AHCI driver 202 executing on the in-band processor 110. This message between the remote block read/write module 216 and the AHCI driver 202 may be sent using a Host Embedded Controller Interface (HECI) or any other memory channel shared between the OOB agent 214 and the OS 200. The AHCI driver 202 may also include an application programming interface (API) 208 configured to receive such messages from the OOB agent 214 and instruct the AHCI 202 to select and send the appropriate storage command from the library 206. The verification module 220, included in some embodiments of the OOB agent 214, will be described in more detail below.

The software stack of the remote server 104 includes an OS (not shown), one or more ISV applications 222, a remote block read/write driver 224, and a file system and other filter drivers 226 (each of which may be executed by the processor 130 and/or stored in the system memory 132 or on the mass storage device 138). As illustrated in FIG. 2, the remote server 104 also includes one or more disk images 228 of the DSD 120 (stored on the mass storage device 138). Similar to the computing device 102, the OS of the remote server 104 (which resides in the userspace) hosts higher-level applications, such as the ISV application(s) 222, for example. The one or more ISV applications 222 may be embodied as storage, security, and/or manageability applications that require secure scans of the DSD 120. The one or more ISV applications 222 (via the OS) may call on the file system and filter drivers 226 (which reside in the kernel), to access the hardware components of the remote server 104 (e.g., mass storage device 138). For instance, the ISV application(s) 222 may access the disk image(s) 228 stored on the mass storage device 138 via the file system and other filter drivers 226. It will be appreciated that any of these software modules, including the OS, the ISV application(s) 222, and/or the drivers 226 may also be implemented partially or fully in firmware or hardware, in some embodiments.

The remote block read/write driver 224 allows the remote server 104 to remotely mount the DSD 120 of the computing device 102. In other words, the remote block read/write driver 224, in conjunction with the OOB agent 214 executing on the computing device 102, allows the remote server 104 to map and, subsequently, access the DSD 120 as if it were a local memory device of the remote server 104. Once the DSD 120 is mounted by the remote server 104, the remote block read/write driver 224 may send a request to read the data at a particular LBA on the DSD 120 to the OOB agent (which is then forwarded to the AHCI driver 202, as described above). Once the requested data has been returned, the OOB agent 214 may transmit this data (along with any associated authentication metadata) using the OOB communication module 218 to the remote block read/write driver 224 of the remote server 104. The remote block read/write driver 224 may then provide the requested data to the ISV application(s) 222 or store this data as a portion of a disk image 228.

The remote block read/write driver 224 also includes a verification module 230 for verifying the authenticity of data retrieved from the DSD 120 using the associated authentication metadata. As described above, where the authentication metadata includes a MAC, the verification module 230 may reapply the hash function to the data (assuming the verification module 230 possesses the shared secret key used by the encryption engine 212) and compare the output to the MAC included in the authentication metadata. Additionally or alternatively, the verification module 230 may compare a counter value in the authentication metadata to the time the data was expected to be retrieved from the DSD 120 to protect against replay attacks. Where the authentication metadata includes a digital signature, the verification module 230 may apply a signature-verifying algorithm using the authentication metadata (assuming the verification module 230 possesses a public key corresponding to the private key used by the encryption engine 212). The verification module 220, which may be included in the OOB agent 214 in some embodiments, may operate in substantially the same manner to verify the authenticity of data retrieved from the DSD 120, prior to transmitting the data to the remote server 104. In embodiments using the verification module 220, the verification module 230 may be omitted from the remote block read/write driver 224 and the OOB agent 214 may forgo transmitting the authentication metadata to the remote server 104 (as the authenticity of the data has already been verified).

Figure 3:
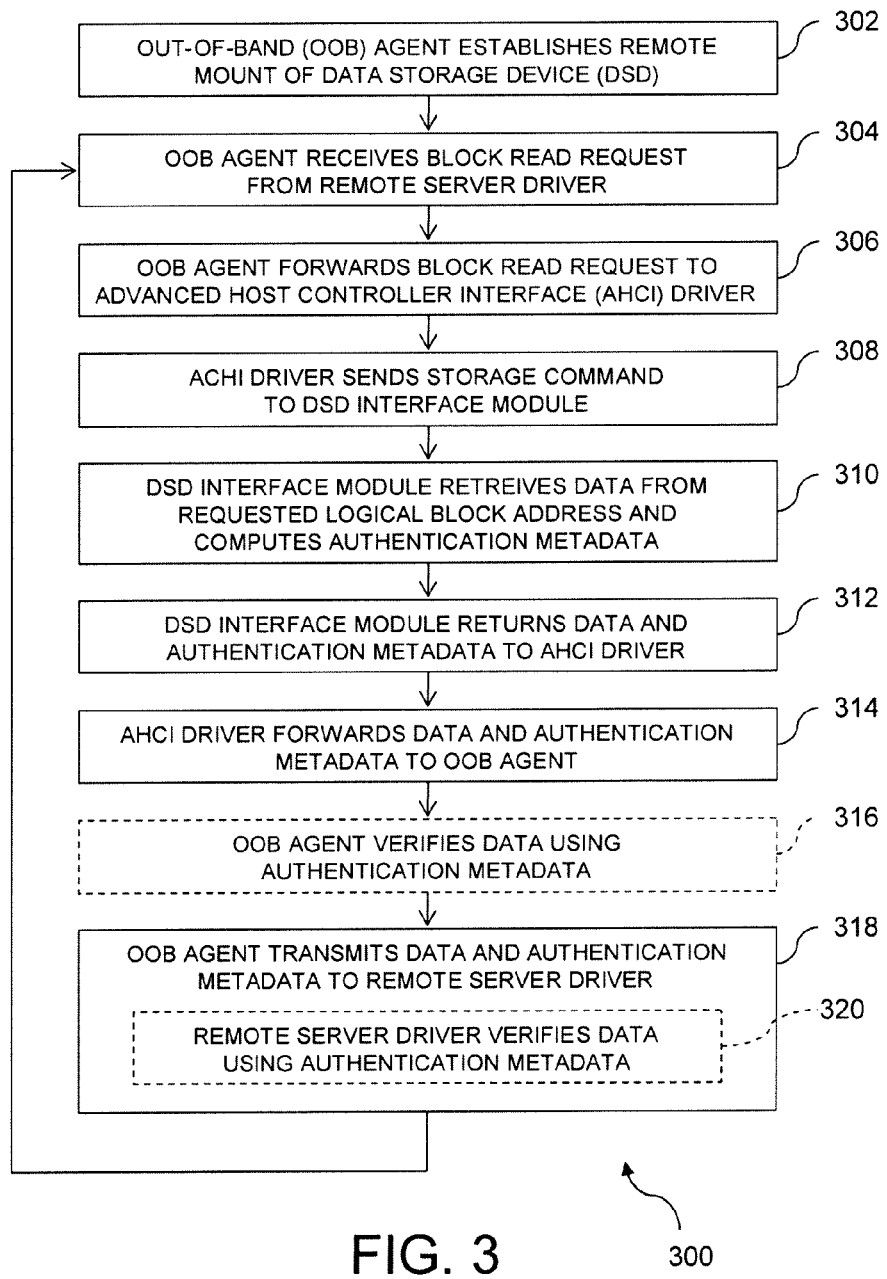
FIG. 3 is a simplified flow diagram of one embodiment of a method for providing a secure scan of a data storage device from a remote server, using the system of FIG. 1 and the software environments of FIG. 2.

Several of the features of the OOB agent 214, running on the OOB processor 124, and of the encryption engine 212, running on the DSD 120, allow the system 100 to provide a secure scan of the DSD 120 of the computing device 102 from the remote server 104. To do so, as illustrated in FIG. 3, the computing device 102 may be configured to perform the method 300 for providing a secure scan over the network 106. In general, the method 300 involves the retrieval of authentication metadata from the DSD 120 that may be used by the OOB agent 214 or the remote block read/write driver 224 of the remote server 104 to verify the authenticity of data retrieved from the DSD 120. The method 300 may be executed by, for example, the OOB processor 124, the in-band processor 110, and the hardware of the DSD 120, in conjunction with other components of the computing device 102, which may interact with other components of the system 100. The method 300 may allow a secure scan of the DSD 120 from the remote server 104 for any purpose, including, but not limited to, anti-virus scans, removal of malware, system repair, system reimaging, and secure file/folder access.

The method 300 begins with block 302 in which the OOB agent 214 establishes a remote mount of the DSD 120 by the remote server 104. The remote mount of the DSD 120 may be initiated by either the computing device 102 or the remote server 104. One process for remotely mounting a data storage device using a remote server, which may be employed in block 302 of the method 300, is disclosed in currently pending U.S. patent application Ser. No. 12/475,216, filed May 29, 2009, and assigned to the assignee of the present application. As described therein, the remote block read/write driver 224 may request, and the OOB agent 214 may transmit, the master boot record (MBR), one or more boot sectors, and/or one or more master file tables (MFTs) of the DSD 120. This data (which may be stored as part of disk image(s) 228 on the mass storage device 138) may allow the remote block read/write driver 224 to map the DSD 120. Whenever data from the DSD 120 is requested by one or more ISV applications 222, the remote block read/write driver 224 may then determine the LBA to request from OOB agent 214, using the MBR, the boot sector(s), and/or the MFT(s) of the DSD 120.

In block 304 of the method 300, the OOB agent 214 receives a block read request from the remote block read/write driver 224 over the network 106. The OOB agent 214 receives this request using the OOB communication module 218. It should be appreciated that the OOB agent 214, due to the persistent power and the out-of-band communication channel maintained by the OOB processor 124 and the communication circuitry 116, is available to receive a such a request from the remote server 104 even when the in-band processor 110 of the computing device 102 is not executing the OS 200 or is in a reduced power state or turned off. While the illustrative embodiment describes direct communications between the remote server 104 and the OOB processor 124 (via the communication circuitry 116, 136), it is also contemplated that the remote server 104 may communicate with the OOB processor 124 via one or more host-based channels (e.g., also involving the in-band processor 110 and OS 200).

In block 306, the OOB agent 214 will forward the received block read request, using the remote block read/write module 216, to the appropriate host driver executing on the in-band processor 110 of the computing device 102. When the in-band processor 110 is executing the OS 200 (i.e., the OS 200 is already booted), the OOB agent 214 may forward the block read request to the AHCI driver 202, as described above. When the in-band processor 110 is in a reduced power state or turned off, or the OS 200 has not yet been booted, however, the remote block read/write module 216 may instead direct the block read request to a BIOS driver of the computing device 102 (the computing device 102 may be powered on by the OOB processor 124, if necessary to give access to the BIOS driver). In such an embodiment, the OOB agent 214 may provide the remote server 104 with access to the DSD 120 irrespective of the state of the OS 200 of the computing device 102.

In block 308, the AHCI driver 202 (or other host driver) sends an authentication storage command to the DSD interface module 210. When it receives the forwarded block read request from the OOB agent 214, the AHCI driver 202 selects the appropriate IOTCL message from the library 206. In the illustrative embodiment of FIGS. 2 and 3, whenever the AHCI driver receives a read request via the OOB API 208, it selects and sends a storage command that will result in the DSD 120 generating authentication metadata, as well as retrieving the requested data. Thus, all requests originating from the remote block read/write driver 224 will result in authentication metadata, which may be used to verify the authenticity of the data retrieved from the DSD 120.

In block 310, the DSD interface module 210 retrieves the requested data from the DSD 120 and generates authentication metadata using the encryption engine 212, in response to receiving the authentication storage command from the AHCI 202. The authentication metadata may include any of the types described above, such as a MAC, a counter value, a digital signature, a cryptographic hash value, and/or the like. In block 312, the DSD interface module 210 returns the data retrieved from the DSD 120 and the authentication metadata generated by the DSD 120 to the AHCI 202. In block 314, the AHCI 202 forwards the data and the authentication metadata to the remote block read/write module 216 of the OOB agent 214.

In embodiments employing the verification module 220, the method 300 proceeds to optional block 316, in which the OOB agent 214 verifies the data retrieved from the DSD 120 using the authentication metadata generated by the DSD 120. This verification of the authenticity of the data retrieved from the DSD 120 may be performed using any of the methods described above. After optional block 316 (or after block 314 in embodiments lacking the verification module 220), the method 300 proceeds to block 318, in which the OOB agent 214 transmits the data and the authentication metadata to the remote block read/write driver 224 over the network 106, using the OOB communication module 218.

In block 320, the remote block read/write driver 224 may employ verification module 230 to verify the data using the authentication metadata (though block 320 may be skipped in embodiments using optional block 316). This verification of the authenticity of the data retrieved from the DSD 120 may be performed using any of the methods described above. Once the data has been verified the remote block read/write driver 224 may provide the requested data to the ISV application(s) 222 and/or store this data as a portion of a disk image 228. The method 300 may return to block 304 when the remote block read/write driver 224 transmits another block read request over the network 106 to the OOB agent 214 (the block 302 need not be repeated during each cycle).

Referring now to FIG. 4, another illustrative embodiment of the software/firmware environments running on the computing device 102 and the remote server 104 of the system 100 is shown as a simplified block diagram. The embodiment of FIG. 4 includes many similar components and modules to FIG. 2, which are labeled using like reference numerals. Except as explained below, the operation of these components and modules may be substantially similar to that described above with reference to FIG. 2. For instance, the operation of the DSD interface module 210, the OOB agent 214, and the software stack of the remote server 104 (including the OS, the one or more ISV applications 222, the remote block read/write driver 224, and the file system and other filter drivers 226) is substantially similar, except that these modules do not include the encryption engine 212, the verification module 220, or the verification module 230. In this illustrative embodiment, the authenticity of the data retrieved from the DSD 120 may be ensured without the need for authentication metadata.

As shown in FIG. 4, the software stack of the computing device 102 includes an OS 200, an AHCI driver 202, and a file system and other filter drivers 204 (each of which may be executed by the in-band processor 110 and/or stored in the system memory 114 or on the DSD 120). In addition, the software stack also includes a secure container 400 executing on the in-band processor 110. The secure container 400 may be embodied as a secure memory and/or execution space that is maintained separately from the OS 200 and associated drivers 202, 204 and is not directly accessible to these software modules (thereby, maintaining the security of the secure container 400). In the illustrative embodiment of FIG. 4, a host driver executing in the secure container, rather than the AHCI driver 202, is directly responsible for accessing the DSD 120. The OS 200 still accesses the DSD 120 indirectly through the AHCI driver 202, but the AHCI driver 202 relies on one or more firmware hooks 402 in the chipset firmware to pass requests to the driver executing in the secure container 400.

The driver executing in the secure container 400 includes a storage command library 206 and an OOB API 208 (similar to those of the AHCI driver 202 in the illustrative embodiment of FIG. 2). In this embodiment, the OOB agent 214 provides the remote server 104 with access to the DSD 120 via the host driver executing in the secure container 400. The remote block read/write module 216 and the OOB communication module 218 function substantially as described above, except that the remote block read/write module 216 forwards a block read request to the OOB API 208 of the driver executing in the secure container 400 (rather than the AHCI 202). The OOB API 208 is configured to receive messages from the OOB agent 214 and instruct the driver to select and send the appropriate storage command from the library 206. The data retrieved from the DSD 120 is then returned to the driver and forwarded directly to the OOB agent 214. As the OS 200 and associated drivers 202, 204 may be avoided during this data transfer, this security concern is eliminated, and authentication metadata need not be generated by the DSD 120.

Figure 5:
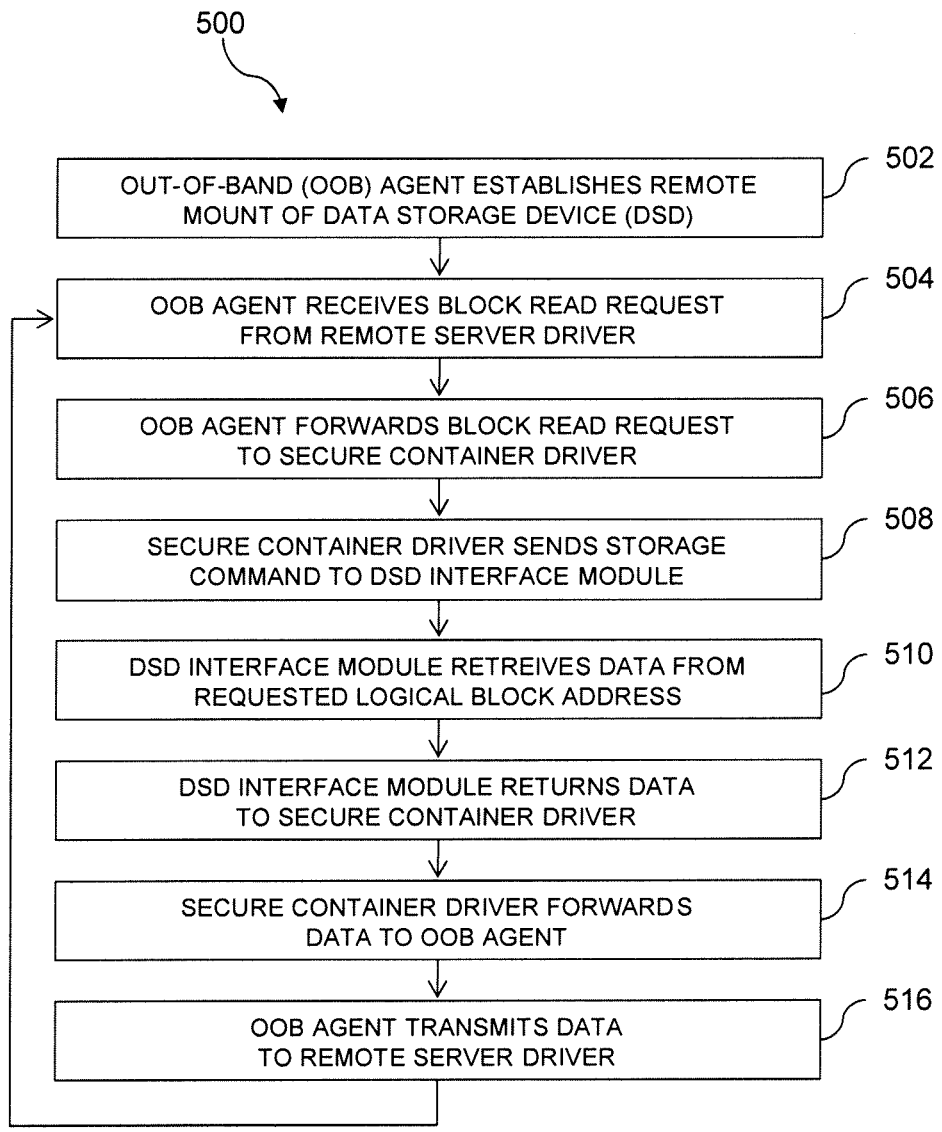
FIG. 5 is a simplified flow diagram of another embodiment of a method for providing a secure scan of a data storage device from a remote server, using the system of FIG. 1 and the software environments of FIG. 4.

Several of the features of the secure container 400, running on the in-band processor 110, and the OOB agent 214, running on the OOB processor 124, allow the system 100 to provide a secure scan of the computing device 102 from the remote server 104. To do so, as illustrated in FIG. 5, the computing device 102 may be configured to perform the method 500 for providing a secure scan over the network 106. In general, the method 500 involves the OOB agent 214 interacting with a host driver executing in the secure container 400 to ensure the authenticity of data retrieved from the DSD 120. The method 500 may be executed by, for example, the OOB processor 124, the in-band processor 110, and the hardware of the DSD 120, in conjunction with other components of the computing device 102, which may interact with other components of the system 100. The method 500 may also allow a secure scan of the DSD 120 from the remote server 104 for any purpose, including, but not limited to, anti-virus scans, removal of malware, system repair, system reimaging, and secure file/folder access.

The method 500 begins with block 502 in which the OOB agent 214 establishes a remote mount of the DSD 120 by the remote server 104. In block 504, the OOB agent 214 receives a block read request from the remote block read/write driver 224 over the network 106. Establishing the remote mount of the DSD 120 and receiving the block read request may be performed substantially as described above with reference to blocks 302 and 304 of FIG. 3.

In block 506, the OOB agent 214 will forward the received block read request, using the remote block read/write module 216, to the host driver executing in the secure container 400 on the in-band processor 110 of the computing device 102. In block 508, the driver executing in the secure container 400 sends a storage command to the DSD interface module 210. When it receives the forwarded block read request from the OOB agent 214, the driver executing in the secure container 400 selects an appropriate IOTCL message from the library 206.

In block 510, the DSD interface module 210 retrieves the requested data from the DSD 120, in response to receiving the storage command from the driver executing in the secure container 400. In block 512, the DSD interface module 210 returns the data retrieved from the DSD 120 to the driver. In block 514, the driver executing in the secure container 400 forwards the data and the authentication metadata to the remote block read/write module 216 of the OOB agent 214. The method 300 concludes with block 516, in which the OOB agent 214 transmits the data to the remote block read/write driver 224 over the network 106, using the OOB communication module 218. The method 500 may return to block 504 when the remote block read/write driver 224 transmits another block read request over the network 106 to the OOB agent 214 (the block 502 need not be repeated during each cycle).

While the disclosure has been illustrated and described in detail in the drawings and foregoing description, such an illustration and description is to be considered as exemplary and not restrictive in character, it being understood that only illustrative embodiments have been shown and described and that all changes and modifications that come within the spirit of the disclosure and the appended claims are desired to be protected.

The invention claimed is:

1. A method comprising:
receiving a block read request from a remote server driver using an out-of-band (OOB) agent executing on a computing device, the OOB agent being capable of communicating with the remote server driver irrespective of the state of an operating system of the computing device;
sending a storage command to a data storage device of the computing device using a host driver of the computing device, in response to receiving the block read request;
receiving data retrieved from the data storage device and authentication metadata generated by the data storage device, in response to the storage command, the authentication metadata being generated as a function of the data retrieved; and
verifying the data, with the OOB agent or the remote server driver, using the authentication metadata.

2. The method of claim 1, wherein receiving the block read request from the remote server driver using the OOB agent comprises receiving the block read request using a firmware module executing on an OOB processor of the computing device.

3. The method of claim 1, wherein receiving the block read request from the remote server driver using the OOB agent comprises receiving the block read request while the operating system of the computing device is not executing.

4. The method of claim 3, wherein sending the storage command to the data storage device comprises generating the storage command using a basic input/output system (BIOS) driver of the computing device.

5. The method of claim 1, wherein sending the storage command to the data storage device comprises sending the storage command using an advanced host controller interface (AHCI) driver of the computing device.

6. The method of claim 1, wherein receiving authentication metadata generated by the data storage device comprises receiving an output of a keyed hash function applied to the data retrieved from the data storage device.

7. The method of claim 6, wherein verifying the data, with the OOB agent or the remote server driver, using the authentication metadata comprises reapplying the keyed hash function to the data and comparing the output of the keyed hash function to the authentication metadata.

8. The method of claim 7, wherein receiving authentication metadata generated by the data storage device further comprises receiving a counter value that indicates a time the data was retrieved from the data storage device.

9. The method of claim 8, wherein verifying the data, with the OOB agent or the remote server driver, using the authentication metadata further comprises comparing the counter value to an expected time.

10. The method of claim 1, wherein receiving authentication metadata generated by the data storage device comprises receiving a digital signature based upon the data retrieved from the data storage device and a private key.

11. The method of claim 10, wherein verifying the data, with the OOB agent or the remote server driver, using the authentication metadata comprises verifying the digital signature using a public key corresponding to the private key.

12. The method of claim 1, further comprising transmitting the data and the authentication metadata to the remote server driver using the OOB agent, wherein the remote server driver verifies the data using the authentication metadata.

13. The method of claim 1, further comprising transmitting the data to the remote server driver using the OOB agent, wherein the OOB agent verifies the data using the authentication metadata prior to transmitting the data.

14. One or more non-transitory, machine-readable media comprising a plurality of instructions that, in response to being executed, result in a computing device:
receiving a block read request from a remote server using an out-of-band (OOB) processor of the computing device, the OOB processor being capable of communicating with the remote server irrespective of whether an in-band processor of the computing device is executing an operating system;
sending a storage command to a data storage device of the computing device using the in-band processor of the computing device, in response to receiving the block read request;
receiving data retrieved from the data storage device and authentication metadata generated by the data storage device, in response to the storage command, the authentication metadata being generated as a function of the data retrieved; and
transmitting the data and the authentication metadata to the remote server using the OOB processor.

15. The one or more non-transitory, machine-readable media of claim 14, wherein receiving the block read request from the remote server using the OOB processor comprises receiving the block read request while the in-band processor is not executing the operating system.

16. The one or more non-transitory, machine-readable media of claim 14, wherein receiving authentication metadata generated by the data storage device comprises receiving a message authentication code generated using the data retrieved from the data storage device.

17. The one or more non-transitory, machine-readable media of claim 16, wherein receiving authentication metadata generated by the data storage device further comprises receiving a counter value that indicates a time the data was retrieved from the data storage device.

18. The one or more non-transitory, machine-readable media of claim 14, wherein receiving authentication metadata generated by the data storage device comprises receiving a digital signature generated using the data retrieved from the data storage device.

19. The one or more non-transitory, machine-readable media of claim 14, wherein the plurality of instructions, in response to being executed, further result in the OOB processor of the computing device verifying the data using the authentication metadata prior to transmitting the data and the authentication metadata to the remote server.

20. A computing device comprising:
an in-band processor configured to execute an operating system and at least one host driver;
communication circuitry configured to communicate with a remote server; and
an out-of-band (OOB) processor capable of communicating with the remote server using the communication circuitry irrespective of the state of the operating system, the OOB processor configured to:
receive a block read request from the remote server;
instruct the at least one host driver to send a storage command to a data storage device of the computing device;
receive data retrieved from the data storage device and authentication metadata generated (i) by the data storage device and (ii) as a function of the data retrieved; and
transmit the data and the authentication metadata to the remote server.

21. The computing device of claim 20, wherein the at least one host driver is a basic input/output system (BIOS) driver executed by the in-band processor before executing the operating system.

22. The computing device of claim 20, wherein the at least one host driver is an advanced host controller interface (AHCI) driver executed by the in-band processor while executing the operating system.

23. The computing device of claim 20, wherein the OOB processor is further configured to verify the data using the authentication metadata prior to transmitting the data and the authentication metadata to the remote server.

24. A computing device comprising:
an in-band processor configured to execute an operating system and at least one driver, the in-band processor executing the driver in a secure container that is separate from the operating system;
communication circuitry configured to communicate with a remote server; and
an out-of-band (OOB) processor capable of communicating with the remote server using the communication circuitry irrespective of the state of the operating system, the OOB processor configured to:
receive a block read request from the remote server;
instruct the at least one driver executing in the secure container to send a storage command to a data storage device of the computing device;
receive data retrieved from the data storage device via the at least one driver executing in the secure container; and
transmit the data to the remote server.

25. The computing device of claim 24, wherein the operating system is configured to retrieve data from the data storage device by instructing, via one or more firmware hooks, the at least one driver executing in the secure container to send a storage command to the data storage device.

* * * * *